United States Patent
VanGilder et al.

(10) Patent No.: US 12,408,294 B2
(45) Date of Patent: Sep. 2, 2025

(54) HYBRID GRID FOR DATA CENTER COMPUTATIONAL FLUID DYNAMICS ANALYSIS

(71) Applicant: SCHNEIDER ELECTRIC IT CORPORATION, Foxboro, MA (US)

(72) Inventors: James William VanGilder, Pepperell, MA (US); Wei Tian, Andover, MA (US); Michael B. Condor, Chelmsford, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 448 days.

(21) Appl. No.: 18/056,819

(22) Filed: Nov. 18, 2022

(65) Prior Publication Data
US 2023/0189474 A1 Jun. 15, 2023

Related U.S. Application Data

(60) Provisional application No. 63/265,365, filed on Dec. 14, 2021.

(51) Int. Cl.
*H05K 7/20* (2006.01)

(52) U.S. Cl.
CPC ..... *H05K 7/20209* (2013.01); *H05K 7/20718* (2013.01); *H05K 7/20836* (2013.01)

(58) Field of Classification Search
CPC ...... G06F 30/13; G06F 30/20; G06F 2119/08; G06F 2111/10; G06F 1/20; G06F 30/23;

(Continued)

(56) References Cited

U.S. PATENT DOCUMENTS

| | | | |
|---|---|---|---|
| 2012/0158387 A1* | 6/2012 | VanGilder | H05K 7/20836 703/9 |
| 2012/0245905 A1* | 9/2012 | Dalgas | H05K 7/20836 703/2 |

(Continued)

FOREIGN PATENT DOCUMENTS

| | | |
|---|---|---|
| CN | 113468785 A | 10/2021 |
| WO | 2008144375 A2 | 11/2008 |

OTHER PUBLICATIONS

"Robertus Franciscus van der Wijngaart, Composite-Grid Techniques and Adaptive Mesh Refinemnet in Computational Fluid Dynamics, Stanford Univerbity, p. 50, Jan. 1990", (Year: 1990).*

(Continued)

*Primary Examiner* — Santosh R Poudel
(74) *Attorney, Agent, or Firm* — Lando & Anastasi, LLP

(57) ABSTRACT

A system for determining and displaying air temperature, pressure, or velocity in an information technology (IT) room including an IT equipment rack. The system comprises a processor configured to receive a model of a layout of equipment within an IT room, define a primary computational grid including base grid cells with dimensions having a first ratio, define a set of computational grid origin offsets for the model, determine a hybrid computational grid having base grid cells, an origin offset selected from among the set of computational grid origin offsets, and a variable grid for the model associated with the computational grid origin offset having a lowest penalty score, perform a computational fluid dynamics analysis of the model utilizing the hybrid computational grid, and provide a display in a graphical user interface illustrating one or more of air temperatures, air pressures, or airflow velocities within the IT room.

27 Claims, 8 Drawing Sheets

(58) Field of Classification Search
CPC .. G06F 30/28; G06F 2113/08; G06F 2113/02; G06F 30/18; G06F 2111/02; H05K 7/20836; H05K 7/20745; H05K 7/20718; H05K 7/20554; G06Q 10/06; F25D 2331/804; F25D 703/01; F25D 703/02; F25D 703/07; F25D 702/13; F25D 702/136
See application file for complete search history.

(56) References Cited

U.S. PATENT DOCUMENTS

| | | | |
|---|---|---|---|
| 2018/0285749 A1* | 10/2018 | Dow | G01C 13/00 |
| 2020/0359532 A1 | 11/2020 | VanGilder | |
| 2022/0026593 A1* | 1/2022 | Maerten | G06F 30/25 |
| 2022/0103961 A1* | 3/2022 | Arteaga | H04S 3/008 |

OTHER PUBLICATIONS

Extended European Search Report from corresponding European Application No. 22213326.6 dated May 4, 2023.

* cited by examiner

HYBRID GRID FOR DATA CENTER COMPUTATIONAL FLUID DYNAMICS ANALYSIS

CROSS-REFERENCE TO RELATED APPLICATIONS

This application claims priority under 35 U.S.C. § 119(e) to U.S. Provisional Patent Application Ser. No. 63/265,365, titled "HYBRID GRID FOR DATA CENTER COMPUTATIONAL FLUID DYNAMICS ANALYSIS," filed Dec. 14, 2021, the entire contents of which is incorporated herein by reference for all purposes.

BACKGROUND

1. Field of the Disclosure

At least one example in accordance with the present disclosure relates generally to systems and methods for enhancing the efficiency of computational fluid dynamics analysis of air temperatures, pressures, velocities, and related physical parameters in an information technology room and for using the results of this analysis to optimize design of the information technology room.

2. Discussion of Related Art

Centralized information technology (IT) rooms or data centers for computer, communications, and other electronic equipment contain numerous equipment racks of equipment that require power, cooling, and connections to external communications facilities. Electronic equipment contained in the equipment racks generate substantial heat and accordingly typical equipment racks use air flow through the racks to cool the electronic equipment. In the design or optimization of the arrangement of equipment in an IT room, computational fluid dynamics analysis may be utilized to determine the air temperatures, pressures, and velocities and related physical parameters throughout the IT room for a given proposed arrangement of equipment. Different possible equipment arrangements may be analyzed utilizing computational fluid dynamics to determine an equipment arrangement that results in optimized airflows and temperatures throughout the IT room.

SUMMARY

In accordance with one aspect, there is provided a system for determining and displaying in a graphical user interface one or more of air temperature, pressure, or velocity in an information technology (IT) room including an IT equipment rack. The system comprises a processor configured to receive an input comprising a model of a layout of equipment within an IT room, define a primary computational grid including base grid cells with dimensions having a first ratio, define a set of computational grid origin offsets for the model, determine a hybrid computational grid having base grid cells, an origin offset selected from among the set of computational grid origin offsets, and a variable grid for the model associated with the computational grid origin offset having a lowest penalty score, perform a computational fluid dynamics analysis of the model utilizing the hybrid computational grid, provide an output including airflow velocities and temperatures of one or more racks of information technology equipment in the IT room, and generate, based on the output, a display in a graphical user interface illustrating one or more of air temperatures, air pressures, or airflow velocities within the IT room.

In some embodiments, the processor is configured to define the set of computational grid origin offsets by defining computational grid origins offset in at least one dimension from an origin of a computational domain of the model by an integer fraction of a length of a dimension of the base grid cells.

In some embodiments, the processor is configured to define the variable grid by defining grid cells at an interface between air and a solid object in the model having at least one dimension being an integer fraction of a length of a dimension of the base grid cells.

In some embodiments, the processor is configured to define the penalty score based on a number of grid cells in the hybrid computational grid having an aspect ratio greater than an aspect ratio of the base grid cells.

In some embodiments, the processor is configured to assign a greater penalty score to grid cells having a first aspect ratio and a lesser penalty score to grid cells having a second aspect ratio smaller than the first aspect ratio.

In some embodiments, the processor is configured to determine the penalty score from a sum of penalty scores of all grid cells in the hybrid computational grid.

In some embodiments, the processor is configured to define the penalty based on a number of grid cells in the hybrid computational grid having volumes or areas less than the volume or area of a base grid cell.

In some embodiments, the processor is configured to assign a greater penalty score to grid cells having a first volume or first area and a greater penalty score to grid cells having a second volume or second area smaller than the first volume or first area.

In some embodiments, the processor is further configured to one of control one or more computer room air conditioners to adjust airflow in the IT room or control one or more items of equipment housed in the rack to reduce power if the rack air outflow temperature is not adequate to provide sufficient cooling to equipment housed in the one or more racks.

In some embodiments, the processor is further configured to define grid cells within the variable grid with dimensions having a second ratio.

In accordance with another aspect, there is provided a non-transitory computer-readable medium storing thereon sequences of computer-executable instructions for determining and displaying in a graphical user interface one or more of air temperature, pressure, or velocity in an information technology (IT) room including an equipment rack. The sequences of computer-executable instructions include instructions that cause at least one processor to receive an input comprising a model of a layout of equipment within an IT room; define a primary computational grid including base grid cells with dimensions having a first ratio, define a set of computational grid origin offsets for the model, determine a hybrid computational grid including base grid cells, a computational grid origin offset selected from among the set of computational grid origin offsets, and a variable grid for the model associated with the computational grid origin offset having a lowest penalty score, perform a computational fluid dynamics analysis of the model utilizing the hybrid computational grid, provide an output including airflow velocities and temperatures of one or more racks of information technology equipment in the IT room, and generate, based on the output, a display in a graphical user interface illustrating one or more of air temperatures, air pressures, or airflow velocities within the IT room.

In some embodiments, the instructions cause the at least one processor to define the set of computational grid origin offsets by defining computational grid origins offset in at least one dimension from an origin of a computational domain of the model by an integer fraction of a length of a dimension of the base grid cells.

In some embodiments, the instructions cause the at least one processor to define the variable grid by defining grid cells at an interface between air and a solid object in the model having at least one dimension being an integer fraction of a length of a side of the base grid cells.

In some embodiments, the instructions cause the at least one processor to define the penalty score based on a number of grid cells in the hybrid computational grid having volumes or areas less than the volume or area of a base grid cell of the hybrid computational grid.

In some embodiments, the instructions cause the at least one processor to assign a greater penalty score to grid cells having a first volume or first area and a greater penalty score to grid cells having a second volume or second area smaller than the first volume or first area.

In some embodiments, the instructions cause the at least one processor to determine the penalty from a sum of penalty scores of all grid cells in the hybrid computational grid.

In some embodiments, the instructions cause the at least one processor to define the penalty score based on a number of grid cells in the hybrid computational grid having an aspect ratio greater than an aspect ratio of the base grid cells.

In some embodiments, the instructions cause the at least one processor to assign a greater penalty score to grid cells having a first aspect ratio and a lesser penalty score to grid cells having a second aspect ratio smaller than the first aspect ratio.

In some embodiments, the instructions further cause the at least one processor to one of control one or more computer room air conditioners to adjust airflow in the IT room or control one or more items of equipment housed in the rack to reduce power if the rack air outflow temperature is not adequate to provide sufficient cooling to equipment housed in the one or more racks.

In some embodiments, the instructions further cause the at least one processor to define grid cells within the variable grid with dimensions having a second ratio.

In accordance with another aspect, there is provided method for determining and displaying in a graphical user interface one or more of air temperature, pressure, or velocity in an information technology (IT) room including an equipment rack. The method comprises receiving, by a computer system, an input comprising a model of a layout of equipment within an IT room, defining, by the computer system, a primary computational grid including base grid cells will dimensions having a first ratio, defining, by the computer system, a set of computational grid origin offsets for the model, determining, by the computer system, a hybrid computational grid including base grid cells, a computational grid origin offset from among the set of uniform-computational grid origin offsets, and a variable grid for the model associated with the computational grid offset having a lowest penalty score, performing, by the computer system, a computational fluid dynamics analysis of the model utilizing the hybrid computational grid, providing, by the computer system, an output including airflow velocities and temperature of one or more racks of information technology equipment in the IT room, and generating, by the computer system, based on the output, a display in a graphical user interface illustrating one or more of air temperatures, air pressures, or airflow velocities within the IT room.

In some embodiments, the method further comprises defining the set of computational grid origin offsets by defining computational grid origins offset in at least one dimension from an origin of a computational domain of the model by an integer fraction of a length of a dimension of the base grid cells.

In some embodiments, the method further comprises defining the variable grid by defining grid cells at an interface between air and a solid object in the model having at least one dimension being an integer fraction of a length of a dimension of the base grid cells.

In some embodiments, the method further comprises defining the penalty based on a number of grid cells in the hybrid computational grid having an aspect ratio greater than an aspect ratio of the base grid cells.

In some embodiments, the method further comprises assigning a greater penalty score to grid cells having a first aspect ratio and a lesser penalty score to grid cells having a second aspect ratio smaller than the first aspect ratio.

In some embodiments, the method further comprises determining the penalty from a sum of penalty scores of all grid cells in the hybrid computational grid.

In accordance with another aspect, there is provided a non-transitory computer readable medium that causes a processor to perform a method. The method comprises receiving an object placement within a computational fluid dynamics (CFD) model, determining the object placement is off of a main grid, wherein the main grid comprises main grid cells having a first cell size, selecting a secondary grid from a set of grids such that the object placement falls on the secondary grid, wherein the secondary grid comprises secondary grid cells having a second cell size that is less than the first cell size and greater than a threshold cell size, at least one side of each of the secondary grid cells having a dimension that is an integer fraction of a dimension of the main grid cells, restricting the object placement such that it falls on the secondary grid, generating a composite grid comprising the main grid and the secondary grid, and generating a CFD solution display across the composite grid.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
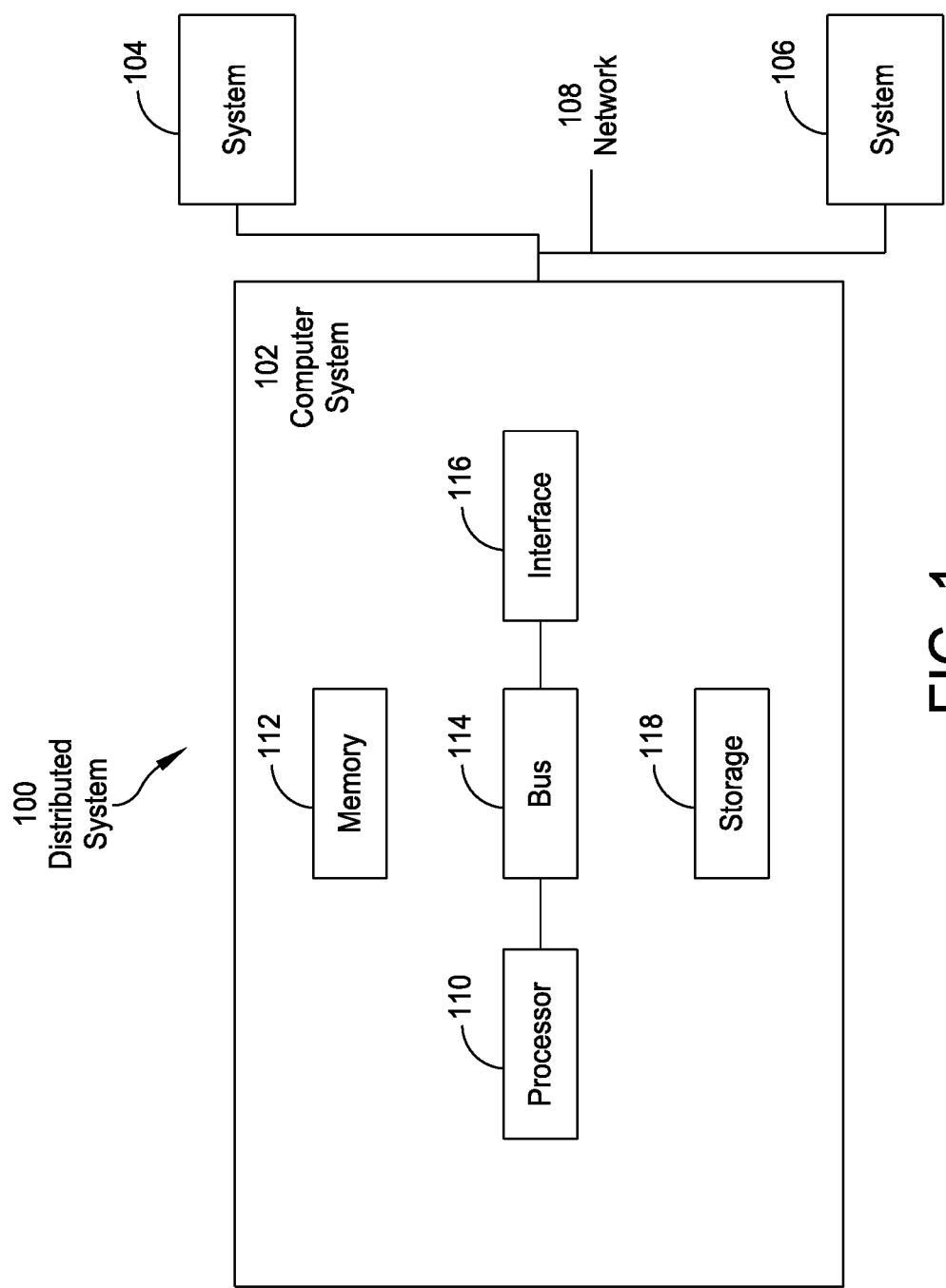
FIG. 1 is a block diagram of one example of a computer system with which various aspects in accord with the present invention may be implemented.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

IT rooms or data centers, the terms being used synonymously herein, may contain one or more types of IT equipment that may manipulate, receive, store, and/or transmit multiple forms of data including, for example, voice or video data. The IT equipment can be housed in IT racks. Instead or in addition, equipment such as power supplies, user interfaces, etc., may be mounted in IT racks in IT rooms. IT rooms may include cooling equipment for the IT equipment. The cooling equipment may be mounted in racks along with the IT equipment or provided as one or more separate units, sometimes referred to as computer room air conditioner (CRAC) units. Data centers are one type of IT room.

Systems and methods disclosed herein provide for airflows through equipment racks in an IT room and associated air temperatures and pressures to be modelled on a computer. The systems may include graphical user interfaces including displays configured to illustrate the modelled air temperatures, pressures, and velocities in the IT room. As a result of the model and generated display, airflow systems for equipment racks can be designed and implemented in existing IT rooms and/or during the design of new IT rooms and/or equipment within the IT room, for example, IT racks, equipment within IT racks, and cooling systems may be relocated or rearranged and/or have operating parameters adjusted to obtain desired temperatures of the IT equipment.

Various computing devices may execute various operations discussed above. Using data stored in associated memory, in one example, a computer executes one or more instructions stored on one or more non-transitory computer-readable media that may result in manipulated data. In some examples, the computer may include one or more processors or other types of computing hardware. In one example, the computing hardware is or includes a commercially available, general-purpose processor. In another example, the computer performs at least a portion of the operations discussed herein using an application-specific integrated circuit (ASIC) tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In various examples, a computer may implement a multi-threading process to execute operations discussed above. For example, while a first thread of the computer may perform operations including determining airflows in an equipment rack, a second thread of the computer may calculate one or more variables associated with airflow models discussed herein. In at least one embodiment, a computer contained within an IT room management system is configured to model airflow in equipment racks using methods described herein. Further, in at least one example, the IT room management system may monitor and control airflows in IT rooms equipment racks based on results generated by the system. Based on model results, IT room cooling systems, including cooling components contained in equipment racks, may be controlled by the IT room management system to improve overall cooling in an IT room.

Aspects disclosed herein in accordance with the present embodiments are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling, and presenting information regarding specific IT room configurations. The computer system may present the information to a user as a display of one or more of airflow, temperatures, and related physical parameters or metrics (e.g., pressures, perforated-tile airflow rates, capture indices, etc.) in a portion or throughout an IT room in a graphical user interface. Further, computer systems in embodiments may receive input from a user and/or directly from physical sensors in the data center that automatically measure environmental parameters in an IT room. The computer system may control equipment, such as chillers or coolers to optimize performance Moreover, the systems described herein may be configured to include or exclude any of the functions discussed herein. Thus, the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware, or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

FIG. 1 shows a block diagram of a distributed computer system 100, in which various aspects and functions in accordance with the disclosed embodiments may be practiced. Distributed computer system 100 may include one more computer systems. For example, as illustrated, distributed computer system 100 includes computer systems 102, 104, and 106. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 102, 104, and 106 may transmit data via network 108 using a variety of security measures including TLS, SSL, or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 1. As depicted, computer system 102 includes processor 110, memory 112, bus 114, interface 116, and storage 118. Processor 110 may perform a series of instructions that result in manipulated data. Processor 110 may be a commercially available processor such as an Intel Core, Motorola PowerPC, SGI MIPS, Sun UltraSPARC, or Hewlett-Packard PA-RISC processor, but may be any type of processor, multi-processor, microprocessor, or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI, and InfiniBand. Thus, bus 114 enables communications, for example, data and instructions, to be exchanged between system components of computer system 102.

Computer system 102 also includes one or more interface devices 116 such as input devices, output devices, and combination input/output devices. Interface devices may receive input or provide output. More particularly, output devices may render information for external presentation. The interface devices 116 may include, for example, one or more graphical user interfaces that may be disposed proximate to or separate from other components of the computer system 102. A graphical user interface of the computer system 102 may, for example, be displayed through a web browser that accesses information from the memory 112. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. The program to be executed by the processor may cause the processor 110 or computer system 102 to perform any one or more embodiments of the methods disclosed herein. Storage system 118 also may include information that is recorded on or in the medium and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system. Portions of the memory 112 or storage system 118 may be included in the same computer system as other components of the computer system 102 or may be resident in a cloud-based system that is accessible via the internet or other communications system or protocol.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 1. Various aspects and functions in accordance with the presently disclosed embodiments may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows NT, Windows 2000 (Windows ME), Windows XP, or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, Small-Talk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accordance with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Example System Architecture

Figure 2:
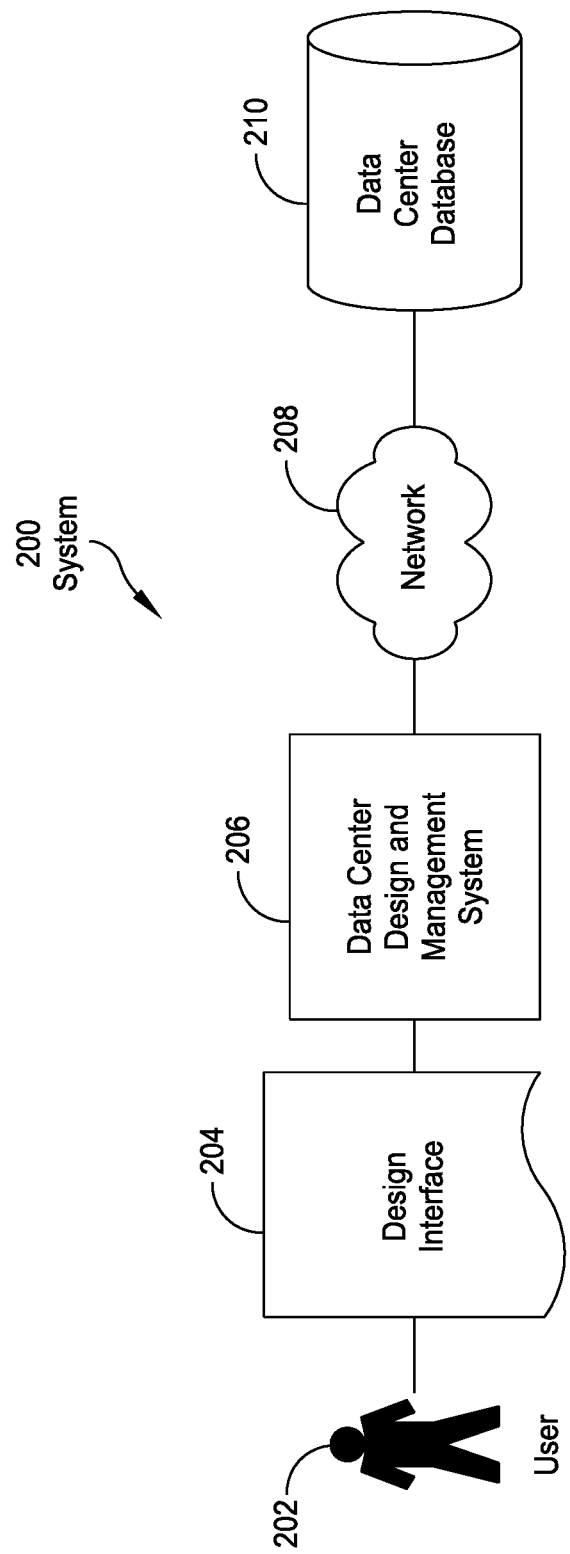
FIG. 2 a schematic of one example of a distributed system including an IT room management system.

FIG. 2 presents a context diagram including physical and logical elements of distributed system 200. As shown, distributed system 200 is specially configured in accordance with the presently disclosed embodiments. The system structure and content recited with regard to FIG. 2 is for exemplary purposes only and is not intended to limit the embodiments to the specific structure shown in FIG. 2. As will be apparent to one of ordinary skill in the art, many variant system structures can be architected without deviating from the scope of the presently disclosed embodiments. The particular arrangement presented in FIG. 2 was chosen to promote clarity.

Information may flow between the elements, components, and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 2, system 200 includes user 202, interface 204, IT room design and management system 206, communications network 208, and IT room database 210. System 200 may allow user 202, such as an IT room architect or other IT room personnel, to interact with interface 204 to create or modify a model of one or more IT room configurations. System 200 may allow user 202 to interact with interface 204 to view a graphical display of results of embodiments of models disclosed herein. According to one embodiment, interface 204 may include aspects of the floor editor and the rack editor as disclosed in Patent Cooperation Treaty Application No. PCT/US08/63675, titled "Methods and Systems for Managing Facility Power and Cooling," filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of an IT room or any subset thereof. This layout may include representations of IT room structural components as well as IT room equipment. The features of interface 204, as may be found in various embodiments in accordance with the present invention, are discussed further below. In at least one embodiment, information regarding an IT room is entered into system 200 through the interface via manual data entry and/or by accessing data from one or more sensors present in an IT room, and assessments and recommendations for the IT room are provided to the user. Further, in at least one embodiment, optimization processes may be performed to optimize cooling performance and energy usage of the IT room.

As shown in FIG. 2, IT room design and management system 206 presents data design interface 204 to user 202. According to one embodiment, IT room design and management system 206 may include the IT room design and management system as disclosed in PCT/US08/63675. In this embodiment, design interface 204 may incorporate functionality of the input module, the display module and the builder module included in PCT/US08/63675 and may use the database module to store and retrieve data.

As illustrated, IT room design and management system 206 may exchange information with IT room database 210 via network 208. This information may include any information needed to support the features and functions of IT room design and management system 206. For example, in one embodiment, IT room database 210 may include at least some portion of the data stored in the IT room equipment database described in PCT/US08/63675. In another embodiment, this information may include any information needed to support interface 204, such as, among other data, the physical layout of one or more IT room model configurations, the production and distribution characteristics of the cooling providers included in the model configurations, the consumption characteristics of the cooling consumers in the model configurations, and a listing of equipment racks and cooling providers to be included in a cluster.

In one embodiment, IT room database 210 may store types of cooling providers, the amount of cool air provided by each type of cooling provider, and a temperature of cool air provided by the cooling provider. Thus, for example, IT room database 210 includes records of a particular type of computer room air conditioning (CRAC) unit that is rated to deliver airflow at the rate of 5,600 cubic feet per minute (cfm) at a temperature of 68 degrees Fahrenheit. In addition, the IT room database 210 may store one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 200.

IT room database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include IT room design and management system 206, network 208, and IT room equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Aspects and embodiments disclosed herein include methods of improving the efficiency of computational fluid dynamics analyses used to determine environmental parameters within a proposed or existing IT room, for example, air temperatures, pressures, and velocities throughout the IT room, in overhead or under-floor plenums of the IT room, and/or within equipment in the IT room, for example, within racks in the IT room. These methods may be performed on embodiments of the computer systems disclosed herein and may be represented by code recorded on non-volatile, non-transitory computer readable medium that may be read by embodiments of the computer systems disclosed herein.

As known in the art, computational fluid dynamics analysis typically involves overlying a computational grid on a computational representation of a space to be analyzed and breaking the model of the space into a number of volumetric units (or two-dimensional units for two-dimensional CFD analysis) referred to as grid cells. The model is assigned an initial state, for example, with the temperature and pressure of all grid cells within the model set at ambient temperature and pressure with no initial air flow between cells. The analysis then proceeds to determine the air and heat flows consistent with the governing laws of conservation of mass, momentum and energy applied to all grid cells. The solution process terminates when all conservation equations have been adequately satisfied and the simulation reaches a steady-state or has covered a physical time period as indicated by the user.

This brief description of CFD analysis is provided for background and is highly simplified. Those of skill in the art would be aware of additional complexities and factors that would be included in a CFD analysis for different implementations.

As noted above, in a CFD analysis, the computational grid subdivides the computational domain volume (the space to be analyzed) into many smaller volumes called grid cells. Generally, one value of each variable (e.g., x-axis component of airflow velocity (u), y-axis component of airflow velocity (v), z-axis component of airflow velocity (w), pressure (P), and temperature (T)) is computed for each grid cell and, thus, the grid cell size is related to the finest resolution to which the physics may be predicted. Generally, grid lines are placed on the surfaces of all solid objects—so that the resulting cells are either entirely "fluid" or entirely "solid." Additional cells may be used to ensure sufficient resolution and accurate predictions. For example, for data center applications, the grid cells are often no larger than 150 mm (6 in).

A major challenge in CFD is balancing the total number of grid cells with solution time. Accuracy generally improves as more cells are added; however, the computation time increases as well. With traditional CFD algorithms in widespread use today, solution time increases exponentially with the number of cells. With the CFD technology in some programs, for example, EcoStruxure™ IT Advisor CFD (ITA CFD) from Schneider Electric, solution time only increases approximately linearly with the number of grid cells.

CFD calculations are non-linear and there is no guarantee in advance that any given simulation will "converge" to a sensible result—one that satisfies the governing equations of mass, momentum, and energy conservation. One strong driver of this "robustness" is the quality of the grid distribution. For most practical applications like data centers, Cartesian grid cells of Aspect Ratio (AR) equal to one (all sides of equal length) are preferred. However, the reliance upon AR=1 cells may become impractical as the resolution of object placement and size becomes smaller. For example, for a given analysis volume, a uniform grid of side-length 50 mm results in 27 times the number of grid cells as a uniform grid of side-length 150 mm. It is for this reason that CFD developers generally offer non-uniform gridding options. The major drawback of existing non-uniform gridding techniques is that they require user action either to define the desired grid manually and/or provide constraints/inputs to an automated gridding algorithm. In either instance, the end user is required to have some level of knowledge and skill related to CFD gridding. CFD software users are then typically advised to ensure that all grid aspect ratios are less than about 10 to ensure solution robustness.

Figure 3:
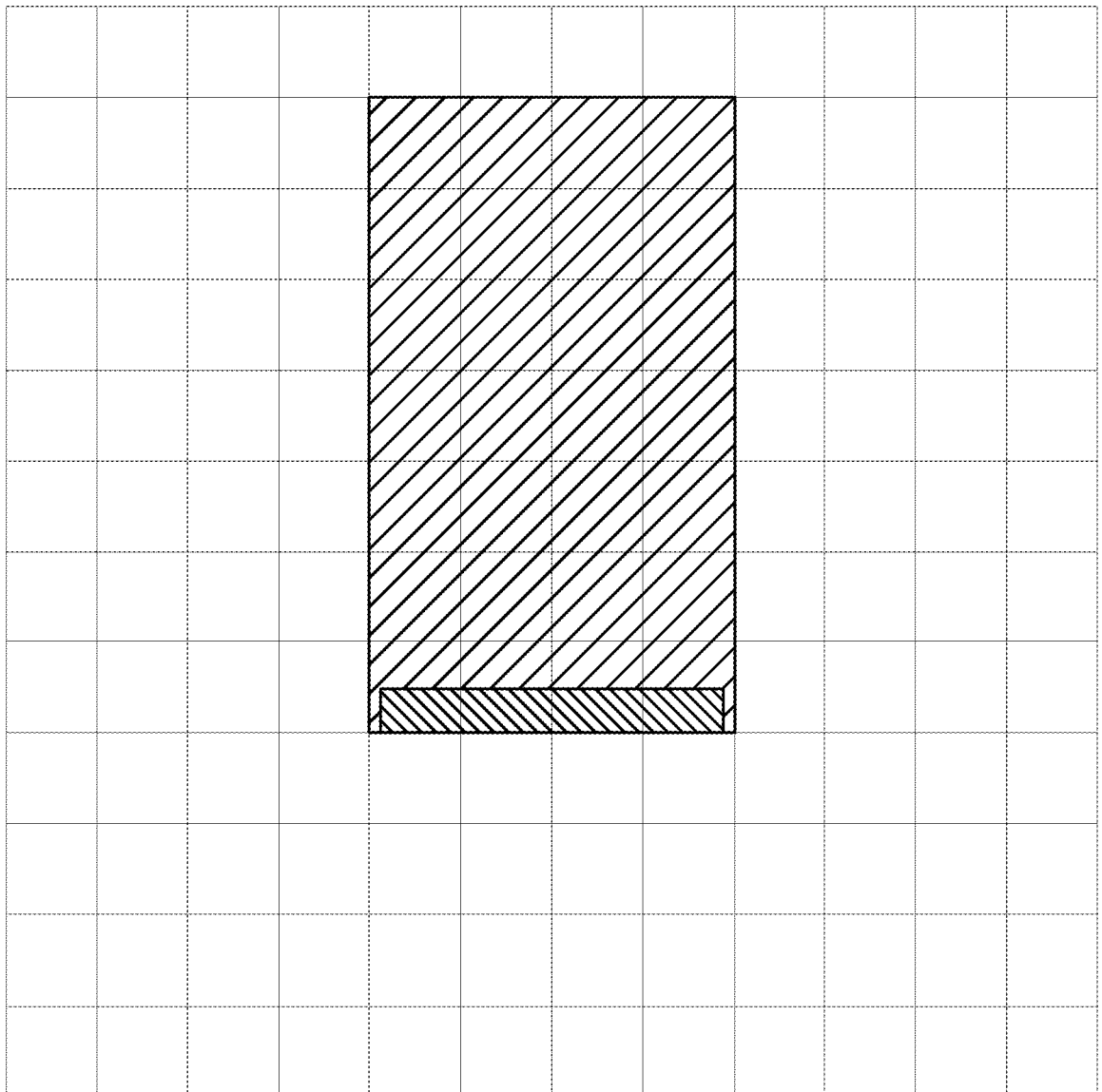
FIG. 3 illustrates a computational grid for a computational fluid dynamics having grid cells with aspect ratios of 1 overlayed on a piece of equipment in a model of an IT room.

ITA CFD currently uses (ideal) AR=1 cells of side length 150 mm as shown in plan view in FIG. 3, illustrating a two-dimensional computational grid overlaid on a piece of equipment, for example, an IT rack in an IT room. Consequently, all objects are sized and placed with multiples of 150 mm. The advantages here are:

1) The user need not have any knowledge of or take any action related to the CFD grid.

2) Solution robustness as affected by grid cell aspect ratio is always "ideal."

Since the solution speed of ITA CFD scales linearly (not exponentially) with the number of grid cells, even simulations of very large data centers require only a few minutes at most on high-end GPU-based hardware. And, since accuracy would be compromised if cells were made larger than about 150 mm anyway, the only real negative with the current uniform-grid approach is that the user is forced to place and size objects strictly with multiples of 150 mm. This is generally not a problem as information technology equipment racks are typically provided with standard sizes of 600 or 750 mm wide, IT room floor tiles are typically squares with sides 600 mm in length, row coolers are typically either 300 or 600 mm wide, etc. Furthermore, it is already common for data center designers and operators to map the size and position of equipment only down to the nearest one quarter of a floor tile spacing (150 mm) in CAD drawings, Visio files, spreadsheets, etc.

Recently, the industry has begun to utilize 800 mm wide information technology racks which are difficult to model with ITA CFD's uniform 150 mm side length grid. Further, although uncommon, 500 mm floor tiles do exist. Industry standard row-based containment typically has an 8 in (200 mm) depth—which is often currently modeled conservatively as only 150 mm deep. Finally, there are small gaps, e.g., under and between racks, for example, as well as other specific features like the solid rim around rack doors and perforated floor tiles; modeling these small-scale features more explicitly may further improve modeling accuracy. For these reasons, despite its considerable advantages in terms of ease-of-use and solver robustness, the current uniform grid system places restrictions on what can be accurately modeled.

Most CFD tools allow users to create objects of any size and position them at any location in the computational domain volume; manual and semi-automatic methods are then used to create additional grid cells around and within the objects. In general, the spacing of grid lines is different in the three coordinate (x, y, and z axis) directions and the resulting grid cells are non-uniform. If the grid cells always extend across the entire computational domain volume (without any discontinuous breaks), the grid type is called a "variable structured grid" or simply a "variable grid." Otherwise, the grid is referred to as "unstructured"; in the latter case, four cells may be adjacent to, say, one cell. Grid lines need not extend across the entire domain and there is no longer a 1-to-1 mapping of cell faces.

Figure 4A:
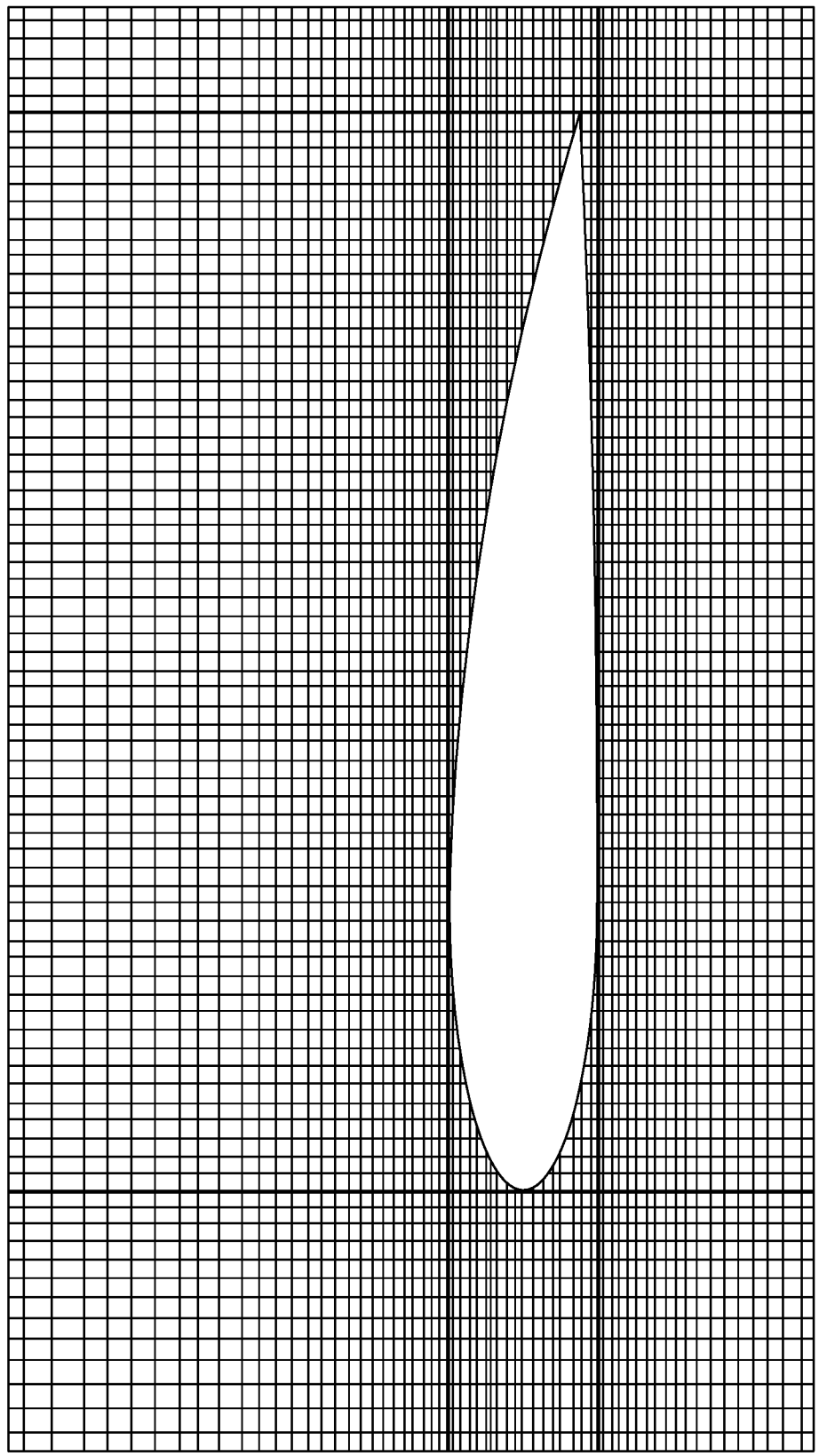
FIG. 4A shows an example of a variable grid about portions of an airfoil.
Figure 4B:
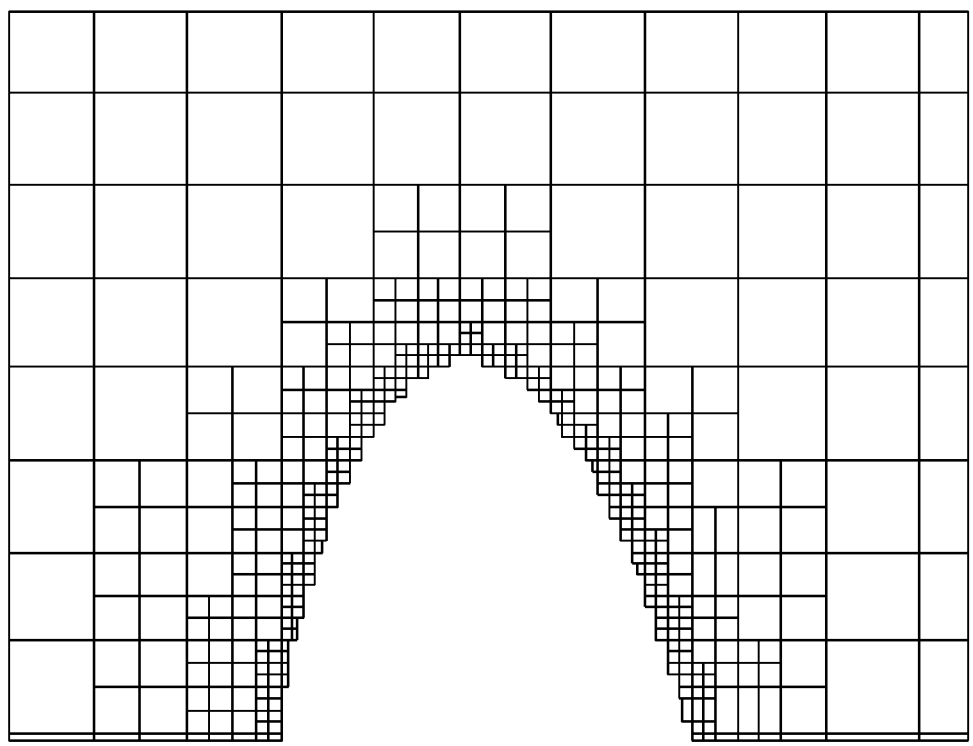
FIG. 4B shows an example of an unstructured grid about portions of an airfoil.

FIG. 4A shows an example of a variable grid and FIG. 4B shows an example of an unstructured grid about portions of an airfoil.

The advantages of variable and unstructured grid are:

1. There is no restriction on object size or location

2. The grid cells may be more efficiently distributed where most needed

The negatives are:

1. The user must take action to create the grid—either entirely manually or by interacting with a semi-automatic gridding algorithm.

2. It is very easy for a user, especially an inexperienced one, to create a poor grid which is either too coarse (cells too large) to ensure accuracy or has large aspect ratios and, thereby, compromises robustness.

Most CFD tools are designed to accommodate a wide variety of applications over which physical length scales may vary from millimeters to kilometers. In contrast, data centers contain objects of standard, similar length-scales that are simply repeated across the entire facility. Because of the standard length-scale, it is known a priori what cell size may be used for a "good" simulation; as noted previously, cells should generally be no larger than about 150 mm (6 in). So, the only significant advantage of variable or unstructured grid schemes for data center applications is the ability to handle non-standard object sizes and locations. Further, the disadvantages noted above are undesirable for a data-center design tool intended for users who may know nothing about CFD let alone proper gridding techniques.

Aspects and embodiments disclose herein utilize a "hybrid grid" which realizes the benefits of both uniform and variable grids with very few negatives for practical applications. The hybrid grid utilizes the existing 150 mm (6 in) uniform grid; these "base" grid cells are fixed relative to one another and are independent of objects. The base grid cells are considered to have dimensions having a first ratio. For example, the base grid cells may have sides with length dimensions satisfying the ratio 1:1 (for two dimensional analysis) or 1:1:1 (for three dimensional analysis). Embodiments are described herein with respect to base grid cells with these uniform aspect ratios. In other embodiments, however, base grid cells with dimensions having different first ratios may be utilized, for example, X, Y, and Z axis side length ratios of 1:1:1.5, 1:1:2, 1:1.5:2, 1:2:2 or any other desired ratio of lengths of the different sides relative to each other.

Figure 5:
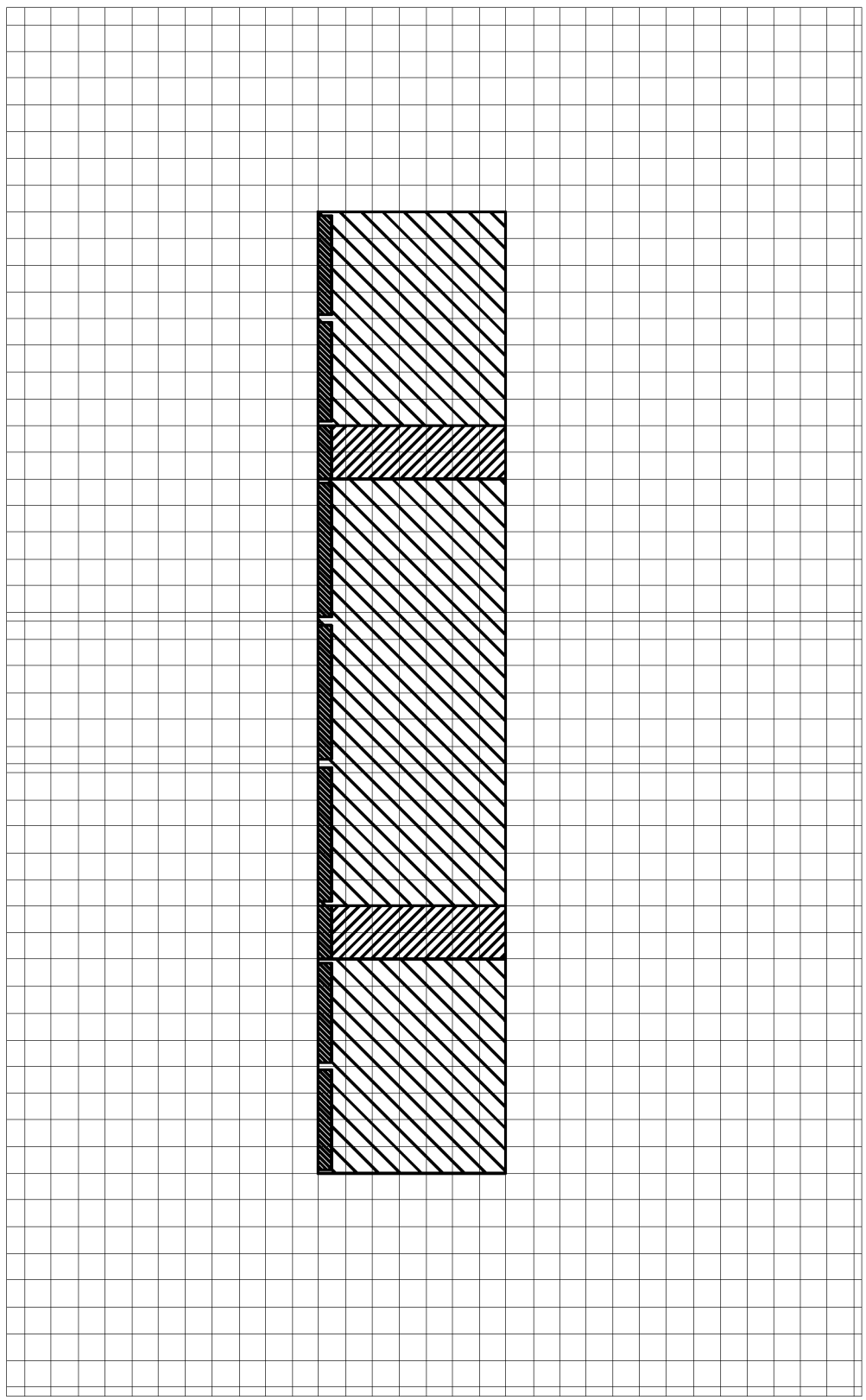
FIG. 5 shows an example of a hybrid grid overlayed on a model of equipment an IT room.

In the disclosed hybrid grid model, despite the 150 mm base grid, users are allowed to size and locate objects down to 50 mm (2 in) increments. Additional grid lines are created coincident with any object face which is not already aligned with the base grid. Thus, the final grid is a superposition of the base grid and additional grid lines. An example is shown in FIG. 5. Note that there are additional cells placed in both the vertical and horizontal directions. The additional grid lines may define grid cells with dimensions, for example, side lengths having a second ratio (or more than one second ratio) that may be different than the first ratio exhibited by the base grid cells.

In one embodiment, because of the lower limit (50 mm) of object sizing and placing refinement, resulting grid side lengths may only be either 50, 100, or 150 mm and the greatest possible aspect ratio is 150/50=3. The second ratio may thus be limited to A:B:C where each of A, B, and C are one of the integers, 1, 2, or 3 and at least one of A, B, or C is different from at least one other of A, B, or C. In contrast, the first ratio may be defined when each of A, B, and C are the same. When each of A, B, and C are the same, the resulting grid cell is considered a uniform grid cell.

Even with a threefold improvement in object size and placement granularity, the grid quality remains very high and no additional action is required on the part of the software user. Testing has revealed only a very small loss of solution robustness and the increase in solution time is almost entirely as expected due to the increased number of grid cells. Further, if only the most standard length-scales (i.e., multiples of 150 mm) and uniform grid cells are employed in a given model, the resulting grid is simply a uniform grid and results are identical to the earlier uniform-grid version of the software.

In other embodiments, other "base grid" and "minimum" length scales may be used. For example, it is possible that a base grid of 150 mm (6 in) with 25 mm (1 in) minimum may provide sufficient robustness for some implementations. In this embodiment, the maximum aspect ratio would be 6 instead of 3 (and the parameters A, B, and C defining the second ratio would be integers ranging from 1 to 6)—less ideal but still below the standard CFD recommendation of 10.

In other embodiments, the base grid may have a size other than 150 mm per side, for example, 200 mm, 125 mm, 100 mm, or other length per side. Objects may be constrained to be modelled with lengths of any integer fraction of the base grid side size, for example, with a base grid having side lengths of L, equipment may be modelled with X, Y, and/or Z axis lengths of N(L/A), where N and A are each integers. In the above example of a base grid with 150 mm sides (L=150 mm) and a minimum length scale of 50 mm, A would be 3. In other embodiments A may take on any integer values desired to achieve a desired model resolution, for example, between 0 and 10. Similarly, distances between objects may be modeled with integer fractions of a base grid side length L–X, Y, and/or Z axis lengths of S(L/B), where S and B are each integers. In some embodiments, the object size and spacing distance constraints may be the same so that A=B.

The new capability provides for intentionally adding grid cells strategically if desired. For example, specifying one or more "smaller" cells just above perforated-floor tiles may improve accuracy. Also, row containment may automatically be divided into three cells instead of one across a 150 mm width—also to improve accuracy.

In some embodiments, the software GUI defaults and object-placement tools incentivize users to create a grid that is as uniform as practical to optimize speed and robustness. For example, when graphically placing an IT rack on the data center floor, the IT rack may automatically snap to the base grid (which may be displayed as a placement or drawing grid for the user) along either one side or the other. The IT rack may also automatically snap to nearby objects to facilitate convenient alignment, for example, to create a row of contiguous IT racks. The user may be provided with some incentive to create and place the objects aligned with the base grid as a first choice unless introducing additional variable grid is unavoidable.

When the grid is uniform, the presentation of results remains the same as in current versions of the ITA CFD software. In situations where additional cells are added, the display of scalar values like pressure, speed, and temperature is largely unchanged. However, since one velocity vector arrow is drawn at every cell center, the addition of (many) smaller cells may noticeably change the density of displayed velocity vectors.

Non-Cartesian grid systems also exist and are widely used in general-purpose CFD codes. In such embodiments, grid cell faces may meet at angles which are not perpendicular. In these embodiments, another measure of grid quality, "skewness," which is a measure of the deviation from perpendicular, may be employed. Such grid systems would probably not be required for modelling data centers as data centers generally feature regular, box-shaped objects for which such a system provides more drawbacks than benefits.

As discussed above, data center walls and equipment populations often map to a uniform 6 in×6 in (150 mm×150 mm) CFD grid. This is very convenient from a CFD perspective as a grid of this size (or finer) is useful to ensure sufficient resolution and accuracy of the airflow predictions. Additionally, the uniform (AR=1) grid cells maximize solution robustness. That said, there are exceptions to this natural mapping to a uniform grid and the hybrid grid provides a strategy to handle these.

It is possible to further optimize the CFD grid to minimize solution time and increase robustness by offsetting the base grid (e.g., by 50 mm or 100 mm or any integer number of the finest grid size) so that the consecutive 150 mm grid lines don't arbitrarily start at a global origin—for example, one corner of the data center. Consider an example in which the entire data center equipment population may map perfectly to the base grid except for the distance from one or more edges of the equipment to the surrounding data center walls. In this case, it may be more desirable to offset (shift) the base grid by starting with, for example, a 50 mm variable grid line than to add variable grid lines to every object in the data center; this strategy reduces the number of grid cells—particularly non-uniform cells—and may provide better CFD modeling symmetry.

As the user creates the virtual data center model, aspects and embodiments disclosed herein continuously fits the best hybrid grid to the model by considering various permutations in which the base grid is shifted by all possible 50 mm increments up to the base grid size in the X, Y, and Z directions. A penalty score may be assigned for each grid cell so that grid cells with X, Y, and Z axis dimensions having higher aspect ratios receive a greater penalty score than grid cells with having lower aspect ratios. In one embodiment, for example, AR=1 cells (or grid cells having the same aspect ratio as the base grid cells) are not penalized, AR=2 cells are penalized, and AR=3 cells are penalized even more. Alternatively, the penalty score may be based on the cell volume (for a 3-dimesional grid) where the largest (e.g., 150 mm×150 mm×150 mm) cells, or grid cells having the same volume as the base grid cells, are not penalized and the smallest (e.g., 50 mm×50 mm×50 mm) cells are penalized most. For a 2-dimesional grid, grid cell areas would be utilized in a similar manner as grid cell volumes are used in a 3-dimesional model to determine penalty scores. Embodiments of the method may start with zero offset in all directions and need not consider additional permutations if the resulting penalty is zero—meaning the default base grid maps perfectly to all data center objects. If all penalty scores are non-zero than the grid corresponding to the smallest penalty score is selected. Ties among grids having the penalty score may be settled by any manner suitable, for example, by choosing the first grid that was calculated with the smallest penalty score. With a 150 mm base grid and 50 mm variable grid, offsets of 0 mm, 50 mm, and 100 mm in result in 27 total permutations. The computing time cost of this additional grid optimization is negligible and yet can provide significant savings in overall solution time while improving accuracy.

Another major advantage of this automatic optimization of the hybrid grid through starting offset is that it decouples the floor-tile or display grid with which the user may interreact in the GUI of the software tool and the CFD grid used for analysis purposes. The CFD engine may automatically and independently find the best CFD grid which inherently maps to the equipment defined. The practical advantage here is that any GUI can call the CFD engine without reference to a floor-tile grid or the fact that the actual data center may start with a fractional portion of a floor tile in one corner. The only constraint is that all walls and equipment are defined down to even 50 mm (2 in) increments. Finally, with the automatic grid-offset, there is no inherent bias in where the additional variable grid lines are placed—as is the case with a fixed-offset (e.g., zero— starting base grid lines in one corner of the room).

As described above with respect to object size and placement constraints, in other embodiments, the base grid size may be different than 150 mm, for example, P, which may be the same or different as the base grid length L described above with respect to object size and placement constraints. The grid origin or base grid offset length may be any integer fraction of P, e.g., C(P/D) where C and D are both integers, C<D. In the example above for a base grid side size of 150 mm and offsets of multiples of 50 mm, P would be 150 mm and the offset lengths are C(P/D), D being 3 and C being 0 (no offset), 1 (50 mm offset), or 2 (100 mm offset).

In embodiments above, processes and systems are provided that can determine relevant temperatures and air flows in an IT room and within racks in the IT room. The systems and methods can be used to provide optimized design of an IT room by using results of the systems and methods to change the actual layout and/or capacity of equipment or the proposed layout and/or capacity of equipment. In processes described above, values related to IT room cooling, including airflows and temperatures may be determined. In at least some embodiments, the values determined are predictions for actual values that will occur in an IT room having the parameters modeled. In methods of at least one embodiment of the invention, after successful modeling of a cluster in an IT room, the results of the model may be used as part of a system to order equipment, ship equipment and install equipment in an IT room as per the designed layout.

In at least some embodiments of the invention discussed herein, the performance of assessments and calculations in real-time refers to processes that are completed in a matter of a few seconds or less rather than several minutes or longer as can happen with complex calculations, such as those involving traditional or historical CFD model calculations.

In at least some embodiments described above, the design of an IT room and/or actual parameters in an IT room are altered based on predicted temperature and/or airflow. For example, a user of the IT room design and management system may change the location of coolers or the types of coolers that are used in the actual layout of equipment or the proposed layout of equipment in the IT room. These alterations may be implemented to improve the cooling performance and/or may be implemented to provide cost and/or power savings when the performance is found to be within predetermined specifications. Further, based on determined airflow values, a data management system in accordance with one embodiment, may control one or more CRACs to adjust the airflow, and in addition, one or more equipment racks can be controlled to reduce power if the airflow is not adequate to provide sufficient cooling.

Based on the outputs of embodiments of the model disclosed herein one or more parameters of cooling and/or similar systems of an IT room may be adjusted, for example, to obtain more desirable airflow and/or temperature distributions within the IT room and/or within individual IT racks or IT equipment in the IT room. Additionally or alternatively, parameters affecting the inlet temperature of IT equipment in an IT room, for example, computational load assigned to different IT equipment may be adjusted based on the outputs of embodiments of the model disclosed herein to obtain more desirable airflow and/or temperature distributions within the IT room and/or within individual IT racks or IT equipment in the IT room. These adjustments may be performed automatically by a computer system implementing aspects of the model or by a computer system receiving the outputs of the model from another computer system implementing the model. These adjustments may additionally or alternatively be performed manually based on data regarding air temperature, air pressure, or air velocity within the IT room, for example, at one or more faces of more or more IT equipment racks that is displayed to a user in a graphical user interface based on outputs of embodiments of the model disclosed herein. A computer system implementing embodiments of the model disclosed herein may provide outputs of the model for use by control systems and methods as described in U.S. patent application Ser. No. 16/617,749, that is incorporated herein by reference in its entirety for all purposes.

Figure 6A:
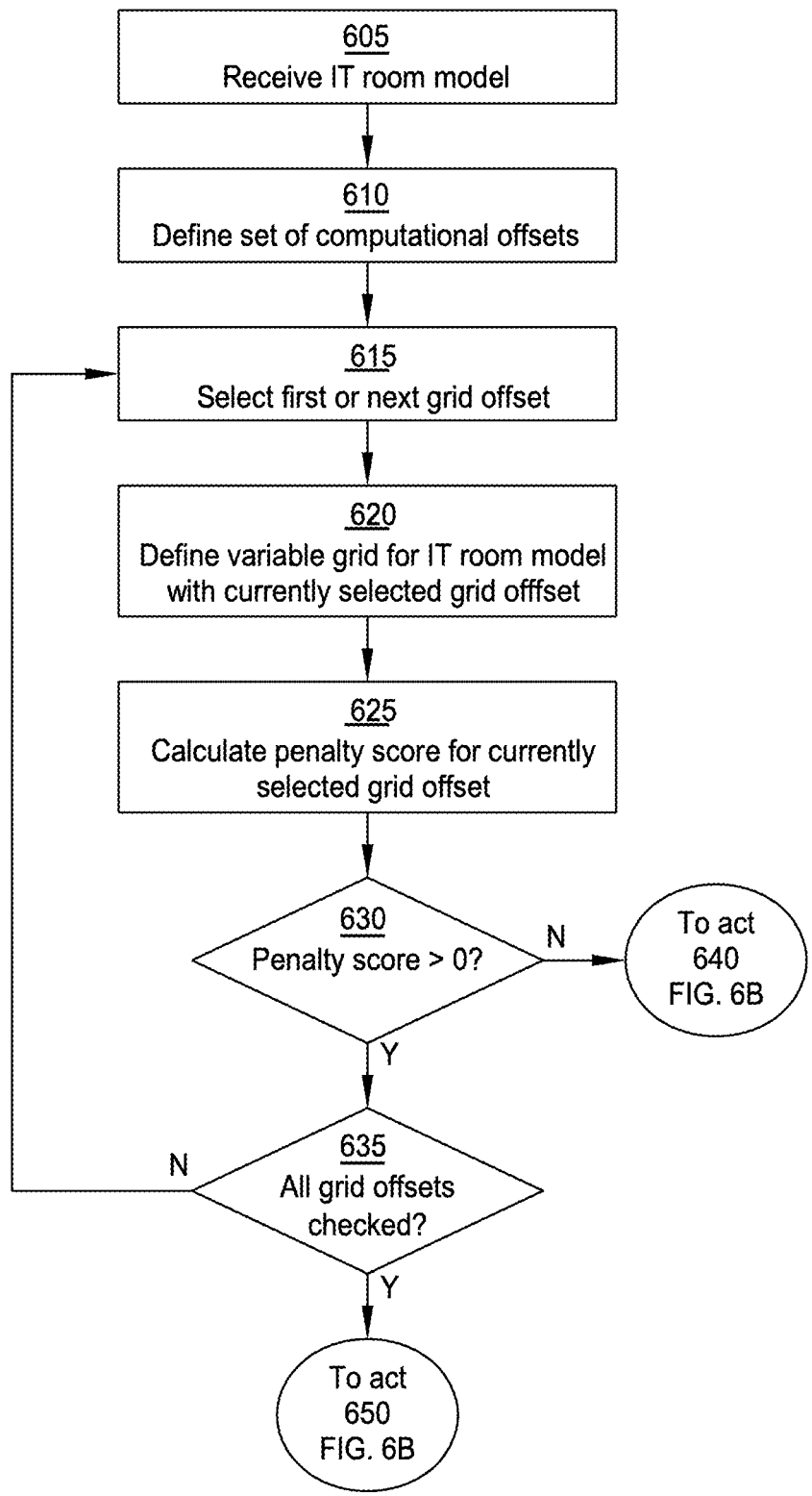
FIGS. 6A and 6B illustrate a flowchart of an example of a method disclosed herein.
Figure 6B:
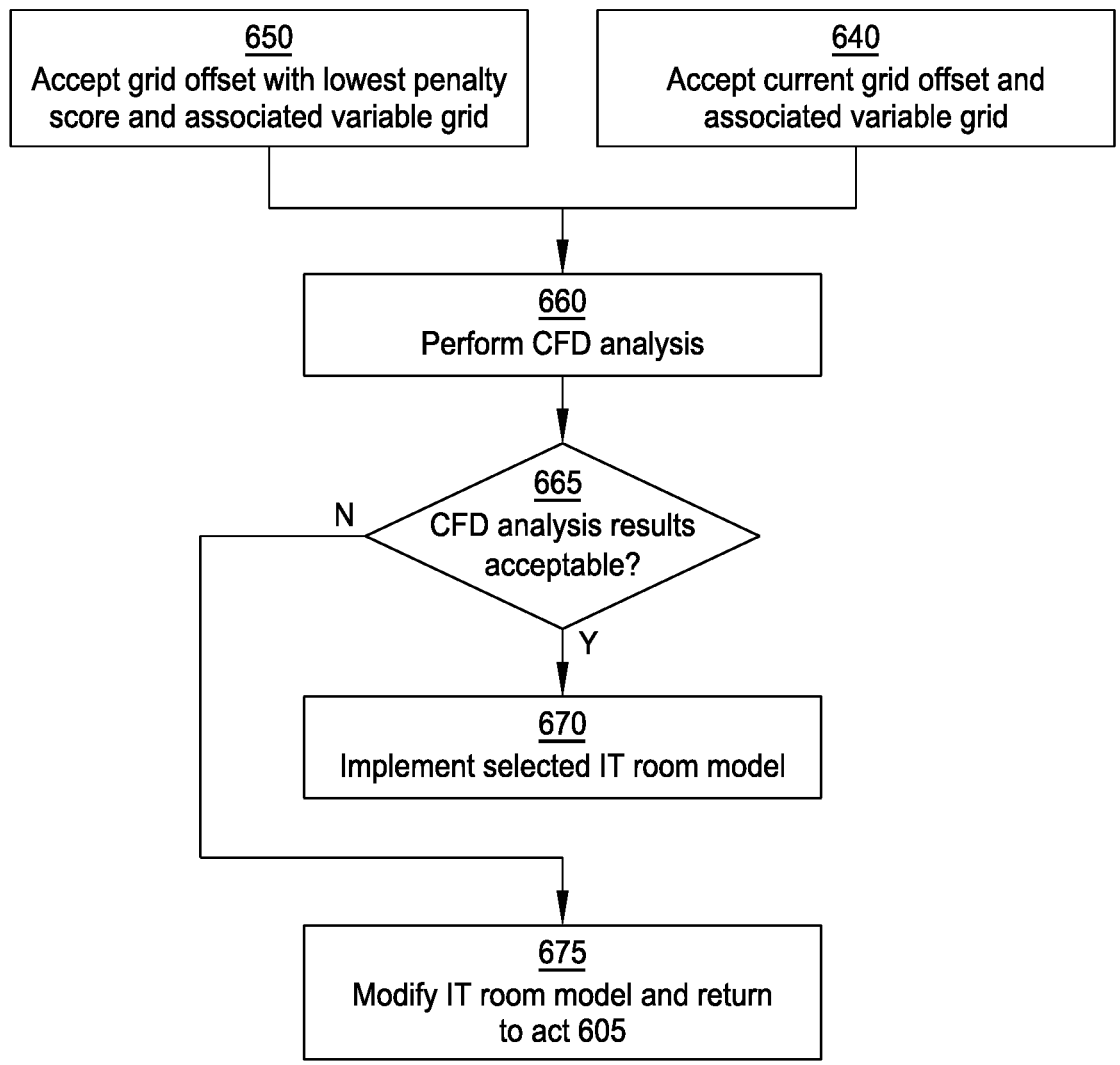

One embodiment of a method as disclosed herein is illustrated in the flowchart of FIGS. 6A and 6B. In act 605, a computer system as disclosed herein receives a model of an IT room including sizing and placement of equipment in the IT room and well as parameters related to heat generation of IT equipment in the IT room, cooling capacity of cooling equipment in the IT room, air flow rates of fans in the racks and cooling equipment in the IT room, as well as all other parameters relevant to air and heat flow and used to calculate desired parameters, for example, temperature and air flow through the equipment in the racks of the IT room, as would be understood to one of ordinary skill in the art. In some embodiments, the model may be obtained from a database a may represent an existing or proposed IT room design or may be entered by a user through an interface such as described in PCT/US08/63675. In some embodiments, constraints may be placed on the dimensions that may be selected for the equipment and spacing between the equipment in the model. The dimensions and spacings may be constrained to be an integer multiple of an integer fraction of a length of a side of a base grid cell to be used in a CFD analysis of the IT room model. For example, if the base grid cells are 150 mm on a side, the dimensions and spacings of the equipment may be constrained to be selected as integer multiples of 50 mm (150 mm/3).

In acts 610-650 a computational grid origin or offset is selected. This act involves setting an origin for a computational grid to be used in CFD analysis of the IT room model that has an origin that is offset from a corner of the computational domain (the space occupied by the model).

There may be a finite number of distances by which the origin of the computational grid may be offset from boundaries of the computational domain These distances may be integer fractions of the length of a side of a base grid cell. For example, for a base grid cell with sides of length 150 mm, the origin of the computational grid may be offset from boundaries of the computational domain by 0 mm (no offset), 50 mm, or 100 mm. In some embodiments for each dimension of interest, for example, the X and Y axes for a 2-dimensional model, or the X, Y, and Z axes for a 3-dimensional model, each offset is selected in series to define a set of computational grid offsets. (Act 610.) For example, in a 3-dimensional model with three possible grid offsets, 3×3×3=27 possible grid origin offsets may be defined.

Grid offsets are assigned scores. A first or if not the first, a next grid offset from the set of grid offsets is selected. (Act 615.) For the selected grid offset, the computer defines a variable grid such that the boundaries of all objects in the IT room model lie on a grid line. (Act 620.) The number of grid cells having differing aspect ratios then defines the score for the grid offset. (Act 625.)

For each grid cell in the computational domain having an aspect ratio of 1 (all sides equal in length) or of largest volume or of largest area, no penalty is assigned. For each grid cell having a first aspect ratio, for example, an aspect ratio of 1.5 in an embodiment of a 2-dimensional computational domain with 150 mm base grid cells and 50 mm possible offsets giving some cells with aspect ratios of 150 mm/100 mm, a first penalty is assigned, for example a penalty score of 1. For each grid cell having a second aspect ratio, for example, an aspect ratio of 3 for cells with aspect ratios of 150 mm/50 mm a second penalty is assigned, for example a penalty score of 2. The total penalty score for a grid offset is determined from the sum of penalty scores of all grid cells with aspect ratios other than 1. Alternatively, penalty scores may be assigned to grid cells having volumes less than the base (largest) volume, with cells having lesser volumes being assigned greater penalty scores or in a 2-dimensional grid, penalty scores may be assigned to grid cells having areas less than the base (largest) area, with cells having lesser area being assigned greater penalty scores. If there is a penalty score of zero, for example, all grid cells having aspect ratios of one or having the same volume or area as the base grid cells, the grid offset giving this zero penalty score is accepted for use in the CFD analysis. (Acts 630, 640.) If the first grid cell offset analyzed has a non-zero penalty and additional grid offsets remain to be scored, the penalty for the next grid cell offset is calculated. (Act 635.) This process iterates for each subsequent grid cell offset until a grid cell offset having a penalty score of zero is identified and accepted for use in the CFD analysis or until the penalty scores for all possible grid cell offsets are calculated. (Act 635.) The grid cell offset with the lowest penalty score is then accepted for use in the CFD analysis. (Act 650.)

The variable grid for each analyzed grid cell offset was determined when determining the penalty score for each analyzed grid cell offset. Accordingly, the variable grid for the selected grid cell offset is applied to the model of the IT room.

A CFD analysis utilizing the selected grid cell offset and variable grid is performed. (Act 660.) If the output of the CFD analysis is acceptable, for example, in terms of computed temperatures in the equipment in the IT room, the method terminates. If the output of the CFD analysis is unacceptable the equipment in the model of the IT room may be rearranged or parameters such as cooling system capacity modified. A grid cell offset and variable grid for an IT room model with rearranged equipment may be determined and CFD analysis of the rearranged IT room performed. This process may be iterated until an acceptable IT room design is determined.

An IT room having the acceptable IT room design may then be constructed or an existing IT room modified to have the acceptable design. (Acts 665, 670, 675.)

It should be appreciated that this example may be extended to 3-dimensional computational domains or computational grids having more than three possible grid cell side-lengths. In these embodiments more than three possible grid cell aspect ratios would be possible and may be assigned penalty scores based upon their difference from a grid cell with an aspect ratio of one.

Current systems for determining and displaying one or more of air temperature, pressure, or velocity in an IT room including an IT rack typically cannot quickly and accurately determine airflow velocities and temperatures and generate, based on the output, a display in a graphical user interface of the system illustrating one or more of air temperatures, air pressures, or airflow velocities within the IT room if the equipment in the IT room does not have boundaries corresponding to a standard grid cell size. This is a technical problem.

An exemplary embodiment of a system for determining and displaying in a graphical user interface one or more of air temperature, pressure, or velocity in an IT room including an IT rack may comprise a processor instructed to receive a model of an IT room and generate a hybrid grid to be used in a CFD analysis of the IT room. The processor may be further instructed to receive an input comprising airflow resistance parameters through the equipment, for example, IT racks, IT equipment airflow parameters, heat-dissipation parameters, and temperatures external to the racks. The heat-dissipation parameter may be associated with the IT equipment airflow parameter, and the IT equipment airflow parameter may be associated with at least one fan providing airflow through the rack. The processor may be instructed to run the input through a CFD analysis that solves for airflows and temperature within the IT room and equipment based on the input and to provide an output including these parameters. The processor may be instructed to generate, based on the output, a display in a graphical user interface illustrating one or more of air temperatures, air pressures, or airflow velocities within the IT room. At least this foregoing combination of features comprises a system for determining and displaying one or more of air temperature, pressure, or velocity in an IT room including an IT rack that serves as a technical solution to the foregoing technical problem. This technical solution is not routine and is unconventional. This technical solution is a practical application of a computer-aided-design system that solves the foregoing technical problem and constitutes an improvement in the technical field of software design for IT-room computer-aided-design applications at least by facilitating faster and more accurate display of air temperature, pressure, or velocity in an IT room including an IT rack.

In at least some embodiments described above, tools and processes are provided for determining temperatures and airflows in an IT room. In other embodiments, the tools and processes may be used in other types of facilities, and may also be used in mobile applications, including mobile IT rooms. Further, processes and systems in accordance with embodiments described herein may be used in overhead air plenums, and other types of air plenums.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A system for determining and displaying in a graphical user interface one or more of air temperature, pressure, or velocity in an information technology (IT) room including an IT equipment rack, the system comprising:
a hardware processor configured to:
receive an input comprising a model of a layout of equipment within an IT room;
define a primary computational grid including base grid cells with dimensions having a first ratio;
define a set of computational grid origin offsets for the model;
determine a hybrid computational grid having base grid cells, an origin offset selected from among the set of computational grid origin offsets, and a variable grid for the model associated with the computational grid origin offset having a lowest total penalty score;
perform a computational fluid dynamics analysis of the model utilizing the hybrid computational grid;
provide an output including airflow velocities and temperatures of one or more racks of information technology equipment in the IT room; and
generate, based on the output, a display in a graphical user interface illustrating one or more of air temperatures, air pressures, or the airflow velocities within the IT room.

2. The system of claim 1, wherein the hardware processor is configured to define the set of computational grid origin offsets by defining computational grid origins offset in at least one dimension from an origin of a computational domain of the model by an integer fraction of a length of a dimension of the base grid cells.

3. The system of claim 1, wherein the hardware processor is configured to define the variable grid by defining grid cells at an interface between air and a solid object in the model having at least one dimension being an integer fraction of a length of a dimension of the base grid cells.

4. The system of claim 1, wherein the hardware processor is configured to define the total penalty score based on a number of grid cells in the hybrid computational grid having an aspect ratio greater than an aspect ratio of the base grid cells.

5. The system of claim 4, wherein the hardware processor is configured to assign a penalty score to grid cells having a first aspect ratio and no penalty score to grid cells having a second aspect ratio smaller than the first aspect ratio.

6. The system of claim 1, wherein the hardware processor is configured to determine the total penalty score from a sum of penalty scores of all grid cells in the hybrid computational grid.

7. The system of claim 1, wherein the hardware processor is configured to define the total penalty score based on a number of grid cells in the hybrid computational grid having volumes or areas less than the volume or area of a base grid cell.

8. The system of claim 7, wherein the hardware processor is configured to assign no penalty score to grid cells having a first volume or first area and to assign a penalty score to grid cells having a second volume or second area smaller than the first volume or first area.

9. The system of claim 1, wherein the hardware processor is further configured to one of control one or more computer room air conditioners to adjust airflow in the IT room or control one or more items of equipment housed in the rack to reduce power if the rack air outflow temperature is not adequate to provide sufficient cooling to equipment housed in the one or more racks.

10. The system of claim 1, wherein the hardware processor is further configured to define grid cells within the variable grid with dimensions having a second ratio.

11. A non-transitory computer-readable medium storing thereon sequences of computer-executable instructions for determining and displaying in a graphical user interface one or more of air temperature, pressure, or velocity in an information technology (IT) room including an equipment rack, the sequences of computer-executable instructions including instructions that cause at least one processor to:
receive an input comprising a model of a layout of equipment within an IT room;
define a primary computational grid including base grid cells with dimensions having a first ratio;
define a set of computational grid origin offsets for the model;
determine a hybrid computational grid including base grid cells, a computational grid origin offset selected from among the set of computational grid origin offsets, and a variable grid for the model associated with the computational grid origin offset having a lowest total penalty score;
perform a computational fluid dynamics analysis of the model utilizing the hybrid computational grid;
provide an output including airflow velocities and temperatures of one or more racks of information technology equipment in the IT room; and
generate, based on the output, a display in a graphical user interface illustrating one or more of air temperatures, air pressures, or the airflow velocities within the IT room.

12. The computer-readable medium of claim 11, wherein the instructions cause the at least one processor to define the set of computational grid origin offsets by defining computational grid origins offset in at least one dimension from an origin of a computational domain of the model by an integer fraction of a length of a dimension of the base grid cells.

13. The computer-readable medium of claim 11, wherein the instructions cause the at least one processor to define the variable grid by defining grid cells at an interface between air and a solid object in the model having at least one dimension being an integer fraction of a length of a side of the base grid cells.

14. The computer-readable medium of claim 11, wherein the instructions cause the at least one processor to define the total penalty score based on a number of grid cells in the hybrid computational grid having volumes or areas less than the volume or area of a base grid cell of the hybrid computational grid.

15. The computer-readable medium of claim 14, wherein the instructions cause the at least one processor to assign a penalty score to grid cells having a first volume or first area and a no penalty score to grid cells having a second volume or second area smaller than the first volume or first area.

16. The computer-readable medium of claim 11, wherein the instructions cause the at least one processor to determine the total penalty from a sum of penalty scores of all grid cells in the hybrid computational grid.

17. The computer-readable medium of claim 11, wherein the instructions cause the at least one processor to define the total penalty score based on a number of grid cells in the hybrid computational grid having an aspect ratio greater than an aspect ratio of the base grid cells.

18. The computer-readable medium of claim 17, wherein the instructions cause the at least one processor to assign a penalty score to grid cells having a first aspect ratio and no penalty score to grid cells having a second aspect ratio smaller than the first aspect ratio.

19. The computer-readable medium of claim 11, wherein the instructions further cause the at least one processor to one of control one or more computer room air conditioners to adjust airflow in the IT room or control one or more items of equipment housed in the rack to reduce power if the rack air outflow temperature is not adequate to provide sufficient cooling to equipment housed in the one or more racks.

20. The computer-readable medium of claim 11, wherein the instructions further cause the at least one processor to define grid cells within the variable grid with dimensions having a second ratio.

21. A method for determining and displaying in a graphical user interface one or more of air temperature, pressure, or velocity in an information technology (IT) room including an equipment rack, the method comprising:
   receiving, by a computer system, an input comprising a model of a layout of equipment within an IT room;
   defining, by the computer system, a primary computational grid including base grid cells with dimensions having a first ratio;
   defining, by the computer system, a set of computational grid origin offsets for the model;
   determining, by the computer system, a hybrid computational grid including base grid cells, a computational grid origin offset from among the set of uniform-computational grid origin offsets, and a variable grid for the model associated with the computational grid offset having a lowest total penalty score;
   performing, by the computer system, a computational fluid dynamics analysis of the model utilizing the hybrid computational grid;
   providing, by the computer system, an output including airflow velocities and temperature of one or more racks of information technology equipment in the IT room; and
   generating, by the computer system, based on the output, a display in a graphical user interface illustrating one or more of air temperatures, air pressures, or the airflow velocities within the IT room.

22. The method of claim 21, further comprising defining the set of computational grid origin offsets by defining computational grid origins offset in at least one dimension from an origin of a computational domain of the model by an integer fraction of a length of a dimension of the base grid cells.

23. The method of claim 21, further comprising defining the variable grid by defining grid cells at an interface between air and a solid object in the model having at least one dimension being an integer fraction of a length of a dimension of the base grid cells.

24. The method of claim 21, further comprising defining the total penalty score based on a number of grid cells in the hybrid computational grid having an aspect ratio greater than an aspect ratio of the base grid cells.

25. The method of claim 24, further comprising assigning a penalty score to grid cells having a first aspect ratio and no penalty score to grid cells having a second aspect ratio smaller than the first aspect ratio.

26. The method of claim 21, further comprising determining the total penalty score from a sum of penalty scores of all grid cells in the hybrid computational grid.

27. A non-transitory computer readable medium that causes a processor to perform a method, the method comprising:
   receiving an input comprising a model of a layout of equipment within an IT room;
   determining that placement of equipment in the model is off of a primary computational grid, wherein the primary computational grid comprises base grid cells having a first cell size;
   defining a variable grid including a grid offset selected from a set of grid offsets having a lowest penalty score among the set of grid offsets such that the placement of the equipment in the model falls on the variable grid, wherein the variable grid comprises variable grid cells having a second cell size that is less than the first cell size and greater than a threshold cell size, at least one side of each of the variable grid cells having a dimension that is an integer fraction of a dimension of the base grid cells;
   restricting the placement of the equipment in the model such that it falls on the variable grid;
   generating a hybrid grid comprising the primary computational grid and the variable grid; and
   performing a computational fluid dynamics analysis of the model utilizing the hybrid computational grid.

* * * * *